United States Patent [19]

Shirahata et al.

[11] Patent Number: 4,690,857
[45] Date of Patent: Sep. 1, 1987

[54] MAGNETIC RECORDING MEDIUM

[75] Inventors: Ryuji Shirahata; Yasuo Tamai, both of Kanagawa, Japan

[73] Assignee: Fuji Photo Film Co., Ltd., Kanagawa, Japan

[21] Appl. No.: 765,485

[22] Filed: Aug. 14, 1985

[30] Foreign Application Priority Data

Aug. 14, 1984 [JP] Japan .................................. 59-169858
Aug. 14, 1984 [JP] Japan .................................. 59-169861

[51] Int. Cl.[4] .............................................. G11B 5/72
[52] U.S. Cl. ...................................... 428/216; 427/44; 427/128; 427/131; 427/132; 428/336; 428/411.1; 428/694; 428/695; 428/900
[58] Field of Search ............ 428/695, 694, 900, 411.1, 428/336, 216; 427/128, 131, 41, 44, 132; 360/134-136

[56] References Cited

U.S. PATENT DOCUMENTS

| | | | |
|---|---|---|---|
| 4,087,582 | 5/1978 | Shirahata | 428/333 |
| 4,390,601 | 6/1983 | Ono | 428/695 |
| 4,476,195 | 10/1984 | Ono | 428/695 |
| 4,499,138 | 2/1985 | Yamamoto | 428/695 |

FOREIGN PATENT DOCUMENTS 0207431 11/1984 Japan .................................. 428/695

Primary Examiner—Ellis P. Robinson
Attorney, Agent, or Firm—Sughrue, Mion, Zinn, Macpeak and Seas

[57] ABSTRACT

A magnetic recording medium comprising a non-magnetic support having provided thereon, in sequence a thin ferromagnetic metal film, and at least one monomolecular layer comprising a saturated fatty acid salt of at least one metal selected from the group consisting of Cd, Co, Mn and Pb, or a polymer of a fatty acid or a derivative thereof.

13 Claims, 1 Drawing Figure

U.S. Patent   Sep. 1, 1987   4,690,857
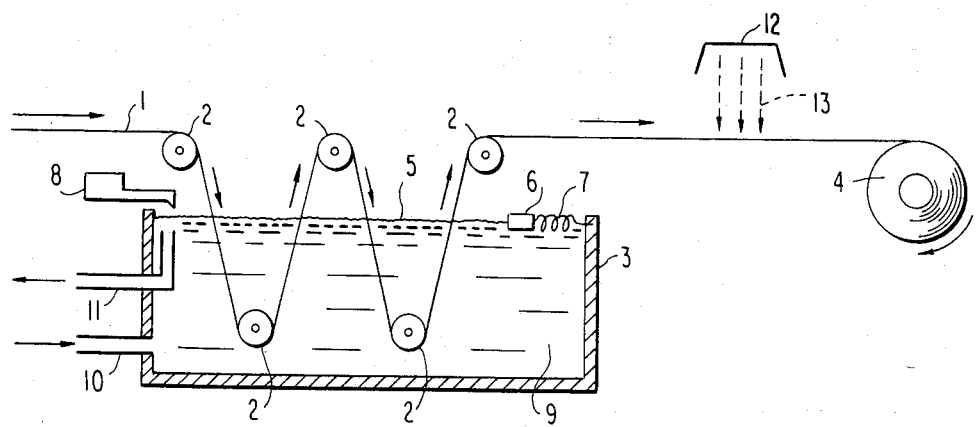

MAGNETIC RECORDING MEDIUM

FIELD OF THE INVENTION

The present invention relates to a magnetic recording medium comprising a thin ferromagnetic metal film as a magnetic recording layer, and more particularly it relates to a thin metal film type magnetic recording medium having excellent durability as well as running property under harsh conditions of a higher temperature and a higher humidity than a normal temperature and a normal humidity.

BACKGROUND OF THE INVENTION

In the past, a coating type of magnetic recording media has been generally employed. As described in U.S. Pat. Nos. 4,307,154, 4,310,565 and 4,333,988, this type of media is generally obtained by coating on a non-magnetic support a magnetic coating composition prepared by dispersing a powdery magnetic material, e.g., a magnetic powder of an oxide such as $\gamma$-$Fe_2O_3$, Co-doped $\gamma Fe_2O_3$, $Fe_3O_4$, Co-doped $Fe_3O_4$, a Berthollide compound composed of $\gamma$-$Fe_2O_3$ and $\gamma$-$Fe_3O_4$, $CrO_2$, etc., a ferromagnetic alloy powder, or so on, into an organic binder. Some conventional binders include vinyl chloride-vinyl acetate copolymer, styrene-butadiene copolymer, epoxy resin, and polyurethane resin. The coated composition is then dried to form a magnetic layer.

In recent years, there has been a demand for recording a large amount of information in a small area of recording material, which is commonly referred to as "high density recording".

With the increased demand for high density recording, there has been an increased demand for the so-called non-binder type of thin metal film type magnetic recording media. Such media contain no organic binders in their magnetic recording layer(s) and have as the magnetic recording layer(s) a thin film(s) of ferromagnetic metal(s) formed by the vapor deposition techniques such as vacuum evaporation, sputtering, or ion plating, or metal plating techniques such as electroplating or electroless plating. Such media have attracted the attention of the art, and various efforts for putting them to practical use have been made. These non-binder type of thin metal film type magnetic recording media are described in U.S. Pat. Nos. 4,250,225, 4,072,781, 4,354,908 and 4,087,582.

Conventional coating type magnetic recording media principally utilize metal oxides as magnetic materials. Furthermore, reduction of the thickness of such media is accompanied by a lowering of the signal output. Therefore, reduction of the thickness of the magnetic recording layer, which is necessary for increasing the recording density, is limited. In addition, they must be manufactured by complicated processes using large sized incidental equipment for recovering solvents used in the manufacturing process. Such equipment and procedures may also involve problems of environmental pollution. On the other hand, non-binder type of thin metal film type magnetic recording media contain ferromagnetic metals, which have saturation magnetization greater than those of the above described metal oxides. Such media are in the form of a thin film which does not contain any non-magnetic substances such as a binder. Therefore, such media can have very thin magnetic films capable of high density recording. In addition, the manufacturing processes are simple.

Magnetic recording media used for high density recording must use magnetic substances having high coercive force and a reduced thickness. Such being the case, non-binder type of thin metal film type magnetic recording media appear to be very promising because it is easy to decrease their thickness one order of magnitude below thickness of the conventional coating type magnetic recording media. Furthermore, such media possess high magnetic flux densities.

In particular, the application of vacuum evaporation techniques to the form of magnetic recording layers is advantageous because it is not necessary to dispose of waste solutions, unlike metal plating techniques, because of the simple manufacturing process, and because the deposition speed of the magnetic metal film can be increased to a high rate. There are known processes for manufacturing a magnetic film having coercive force and squareness ratio desired for magnetic recording media by utilizing vacuum deposition processes, e.g., an oblique incident evaporation method, as disclosed in U.S. Pat. Nos. 3,342,632 and 3,342,633.

Further, magnetic recording media provided with ferromagnetic metal thin films must have high corrosive strength, abrasive strength, and running stability. The magnetic recording media and a magnetic head are in relative motion at high speed when they contact each other while recording, reproducing, and during erasing operations of magnetic signals. In such operations, smooth and stable running of the magnetic recording media must be ensured. Furthermore, wear or rupture caused by continual contact with a magnetic head must be avoided. It is also desired that there is little or no decrease or unintentional erasure of signals recorded in the magnetic recording media with the lapse of time, for example, that caused by corrosion or rust during storage.

It has accordingly been proposed that a protective layer be provided in order to improve durability and weather resistance.

It is disclosed in Japanese Patent Application (OPI) No,. 41527/81 (the term "OPI" as used herein refers to a "published unexamined Japanese patent application") that a monomolecular layer comprising a higher fatty acid or a metal salt thereof is chemical-adsorbed as a protective layer for thin magnetic metal film type magnetic recording media. Further, it is disclosed in U.S. Pat. No. 4,087,582 that a monomolecular layer comprising a saturated fatty acid or a metal salt thereof is provided as a protective layer for thin magnetic metal film type magnetic recording media. Accordingly, weather resistance, durability, and running properties can be improved by providing a monomolecular layer comprising a fatty acid or metal salt thereof (the metal includes an alkali metal or an alkali earth metal). However, running properties at a higher temperature (30° C. or more) as well as at a higher humidity (75% RH or more) than a normal temperature (15° to 30° C.) and a normal humidity (60 to 75% RH) are not satisfactory for a thin metal film type magnetic recording medium, and additional improvements are necessary in order to put the medium into practical use.

SUMMARY OF THE INVENTION

An object of the present invention is to provide a novel thin metal film type magnetic recording medium having significantly improved durability and running properties under conditions of a higher temperature and a higher humidity than a normal temperature and a normal humidity.

The present invention relates to a magnetic recording medium comprising a non-magnetic support having provided thereon, in sequence a thin ferromagnetic metal film as a magnetic recording layer, and at least one monomolecular layer comprising a saturated fatty acid salt of at least one metal selected from the group consisting of Cd, Co, Mn and Pb, or a polymer of a fatty acid or a derivative thereof.

Preferably, the monomolecular layer comprising a metal salt of a saturated fatty acid preferably is prepared by a Langmuir Blodgett method. Further the monomolecular layer comprising a polymer of a fatty acid or a derivative thereof is a Langmuir Blodgett polymerized layer, or is a Langmuir Blodgett polymerized layer which comprises at least one layer of a polymer prepared by polymerizing a fatty acid or a derivative thereof selected from the group consisting of vinyl stearate, ω-triconsanoic acid and diacetylene derivative.

BRIEF DESCRIPTION OF THE DRAWING

The sole FIGURE of the drawing shows one embodiment of an apparatus suitable for preparing a magnetic recording medium of the present invention.

DETAILED DESCRIPTION OF THE INVENTION

The present invention relates to thin metal film type magnetic recording medium comprising a thin ferromagnetic metal film, prepared by, for example, by electroplating, electroless plating, gas phase plating, sputtering, evaporation or ion plating, having provided thereon at least one monomolecular layer, preferably containing at least one metal salt selected from Cd salt, Co salt, Mn salt and Pb salt of a saturated fatty acid.

A monomolecular layer as referred to herein is a layer wherein monomolecules are regularly and densely arranged on the surface of a liquid or a solid and are adhered thereto. The thickness of the layer is equivalent to the size (15 to 50 Å) of one molecular. A suitable method for preparing a monomolecular layer on a surface of a thin ferromagnetic metal film is a coating method, vapor deposition method and the like, and among those, the Langmuir Blodgett method ("Physical Review", 51, 964 (1937)) is the most preferred. That is, this method comprises dissolving a saturated fatty acid in a volatile solvent such as benzene or chloroform, dropping the resulting solution on a surface of water containing ions of at least one metal which is selected from Cd, Co, Mn and Pb to form a monomolecular layer on the surface of the water, dipping a thin ferromagnetic metal film into the water, taking out the film therefrom to transfer the monomolecular layer of metal salt of fatty acid from the surface of the water to the surface of the ferromagnetic thin metal film. Many monomolecular layers can be formed on the surface of the thin ferromagnetic metal film by repeating the above described procedure. In this instance, it is preferred that the monomolecular layer is given surface pressure from a horizontal direction by spring 7 of FIGURE to make the monomolecular layer on the surface of the water more dense and to transfer the monomolecular layer from the surface of the water to the surface of the thin ferromagnetic metal film more easily.

A suitable metal salt of saturated fatty acids for forming a monomolecular layer is preferably a metal salt of Cd, Co, Mn or Pb of a straight chain type saturated fatty acid having 8 to 28 carbon atoms.

Practically preferred saturated fatty acids include tridecanoic acid, tetradecanoic acid (myristic acid), pentadecanoic acid, hexadecanoic acid (palmitic acid), heptadecanoic acid (margaric acid), octadecanoic acid (stearic acid), nonadecanoic acid, eicosanic acid (arachic acid) and hen-eicosanic acid, having 13 to 21 carbon atoms. Particularly preferred fatty acids are a linear type saturated fatty acid having 14 to 18 carbon atoms.

Suitable supports which can be used in the present invention include a plastic base such as polyethylene terephthalate, polyimide, polyamide, polyvinyl chloride, cellulose triacetate, polycarbonate, polyethylene naphthalate or polyphenylene sulfide, Al, Ti and stainless steel.

Further, in one embodiment of the present invention, the magnetic recording medium comprises a non-magnetic support having provided thereon a thin ferromagnetic metal film containing at least one layer of a Langmuir Blodgett polymerized layer on the film. The Langmuir Blodgett layer is at least one layer of a polymer prepared by polymerizing a fatty acid derivative selected from vinyl stearate, ω-triconsanoic acid or diacetylene derivative.

That is, the present invention in this embodiment relates to a magnetic recording medium of a thin metal film type comprising a thin ferromagnetic metal film prepared by a method such as the above described electroplating, electroless plating, gas phase plating, sputtering, vapor deposition or ion plating, having provided thereon at least one Langmuir Brodgett polymerized layer.

The Langmuir Blodgett polymerized layer referred to herein is a layer which is obtained by the method which comprises accumulating the condensed monomolecular layer formed on the surface of water one after another on the surface of a thin ferromagnetic metal film by a Langmuir Blodgett method ("Physical Review", 51, 964 (1937)), and then irradiating electron beams or electromagnetic beams (e.g., γ-ray and ultraviolet rays) thereon for polymerization.

As described above, a monomolecular layer is formed on the surface of water by dissolving a fatty acid and the like in a volatile solvent, such as benzene or chloroform, and dropping the resulting solution on a surface of water. Further a monomolecular layer of a metal salt can be prepared by introducing a suitable metal ion into the water. Subsequently, when a thin ferromagnetic metal film is dipped into the water and taken out therefrom, a monomolecular layer is transferred onto the surface of the thin metal film. Multiple layers can be formed by repeating the above described procedure. It is preferred that the monomolecular layer is given surface pressure from a horizontal direction by spring 7 of FIGURE to make the monomolecular layer on the surface of the water more dense and to transfer the monomolecular layer from the surface of the water to the surface a thin metal film more easily. The surface pressure in the present invention is generally 10 to 40 dynes/cm, particularly preferably 15 to 35 dynes/cm. The thus obtained monomolecular layer on the surface of the thin ferromagnetic metal film can be irradiated with electron beams, electromagnetic beams (e.g., γ-rays or ultraviolet rays) for polymerization to obtain a polymerized layer. Preferred fatty acid derivatives used for preparing a polymerized layer in the present invention are vinyl stearate $CH_3(CH_2)_{16}COOCHCH_2$, ω-triconsanoic acid $CH_2CH(CH_2)_{20}COOH$ and diacetylene derivative $CH_3(CH_2)_{n-1}C_4(CH_2)_8COOH$ (n=8 to 15).

Turning now to the drawing, there is shown one embodiment of an apparatus used for forming a lubricating protective layer of the present invention. A web 1 of magnetic tape provided with a thin ferromagnetic metal film is guided by guide rollers 2 into and then out of a bath 3 for forming a lubricating protective layer, and after a lubricating protective layer comprised of a monomolecular layer is formed, a web 1 of magnetic tape is wound up by a roll 4. Bath 3 is filled with water 9 containing or not containing a metal ion, and a monomolecular layer 5 of a fatty acid is formed on the surface of water. Substances (e.g., a fatty acid and the like) for forming a monomolecular layer are continuously provided through a nozzle 8, and the monomolecular layer 5 on the surface of the water is continuously given a constant surface pressure (10 to 40 dynes/cm) by a float 6 and a spring 7. When a web 1 of magnetic tape comes into the water and goes out of the water, a monomolecular layer 5 on the surface of the water transfers to the surface of the thin ferromagnetic metal film provided on the web of magnetic tape 1. Water 9 containing or not containing a metal ion properly calculates through a water supply pipe 10 and a drainpipe 11. In order to polymerize the monomolecular layer, the web 1 of magnetic tape formed with the monomolecular layer thereon is irradiated with energy rays 13 (e.g., electron beams or electromagnetic beams) coming from irradiation source 12.

The number of monomolecular layers which can be formed on the surface of the thin ferromagnetic metal film and used as a lubricating protective layer is preferably 1 to 100, so that spacing loss does not affect the decrease of output, and 10 monomolecular layers can still be useful. The total thickness of the layer is preferably in a range of 15 Å to 2000 Å.

A suitable thin ferromagnetic metal film which can be used in the present invention is a thin film of ferromagnetic metal such as iron, cobalt, nickel and the like or a thin film of ferromagnetic metal alloy such as Fe-Co, Fe-Ni, Co-Ni, Fe-Rh, Co-P, Co-B, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W or Co-Ni-Re. The thin ferromagnetic film can be prepared by a method such as electroplating, electroless plating, gas phase plating, vacuum evaporation, sputtering, or ion plating, and can have a thickness of 0.02 to 2 μm, preferably 0.05 to 0.4 μm.

Further, the element such as O, N, Cr, Ga, Ae, Sr, Zr, Nb, Mo, Rh, Pd, Sn, Sb, Te, Pm, Pe, Os, Ir, Au, Hg, Pb and Bl may be added in the thin ferromagnetic material to improve magnetic properties, weather resistance and still durability.

The present invention is illustrated in more detail with reference to the following examples, but should not be limited thereto. All parts are by weight.

EXAMPLE 1

A polyethylene terephthalate film having a ½ inch width and a 15 μm thickness in a tape shape was subjected to electroless plating treatment using the following plating solution and plating conditions to prepare a Co-P (Co content: 98%, P content: 2%) magnetic layer having a thickness of 0.25 μm, by a continuous plating apparatus. Sumer sensitizer and Sumer activator manufactured by Nippon Kanizen Co., Ltd. were used as a pre-treating solution for the electroless plating.

Cobalt chloride ($CoCl_2.6H_2O$): 9.5 g/l
sodium hypophosphite ($NaH_2PO_2H_2O$): 5.3 g/l
Ammonium chloride: 10.7 g/l
Citric acid: 26.5 g/l
Boric acid: 30.9 g/l.

Plating conditions: pH: 7.5; Temperature of the plating solution: 80° C.

Further, three monomolecular layers of various metal salts of stearic acid were formed on the Co-P magnetic layer prepared by the electroless plating method using the apparatus as shown in FIGURE. In this instance, the surface pressure was 30 dynes/cm and the water 9 in bath 3 was water where chlorides of various metals were dissolved. The thus obtained tapes were checked at 45° C. and 90% relative humidity to measure the μ value (i.e., friction coefficient) to a stainless pole and running properties after the repeated run on a β-type VTR (number of the repeated run). The results for four salts of the present invention and two comparative salts are shown in Table 1.

TABLE 1

| Sample No. | Metal salts of stearic acid | μ value after 100 passes | Number of repeated run |
|---|---|---|---|
| 1 (invention) | Cd salt | 0.27 | more than 100 passes |
| 2 (invention) | Co salt | 0.27 | more than 100 passes |
| 3 (invention) | Mn salt | 0.28 | more than 100 passes |
| 4 (invention) | Pb salt | 0.27 | more than 100 passes |
| 5 (comparative sample) | Ba salt | 0.39 | Tape stopped at 37 passes |
| 6 (comparative sample) | Ca salt | 0.42 | Tape stopped at 42 passes |

μ value (Friction coefficient)

Sample tapes were mounted on a stainless pole in which the tape tension measured for sending out the tape was $T_1$ and the tape tension for drawing it was $T_2$.

The friction coefficient (μ) was calculated by the formula $T_2/T_1 = \exp(\mu\pi)$. $T_1$ and $T_2$ were measured at 45° C. and 90% RH. And tapes were drawn at a speed of 14 mm/sec. That is, as friction coefficient is smaller, running property is better (see the International Electro-Technology Committee ISO-R-468-1966) (hereinafter the same).

Number of repeated run

Sample tapes were run repeatedly on a VTR ("V-500D" manufactured by Toshiba Co., Ltd.) at 45° C. at 90% RH, and number of repeated run was measured (hereinafter the same).

EXAMPLE 2

A polyethylene terephthalate film having a 12.5 μm thickness was put in a Continuous-Roll Coating System for Vacuum Evaporation. An alloy of Co-Ni (Co content: 75 wt%, Ni content: 25 wt%) was evaporated from an evaporation source by electron beams so that a vapor flow having an angle of incidence of 60° to 90° reached the polyethylene terephthalate film traveling along a cooling can (a cooling roll) to vapor deposit a magnetic layer having a 0.15 μm thickness. In this instance, oxygen gas was introduced into the place where the vapor flow had an angle of incident of about 60° C. Five monomolecular layers of various metal salts of palmitic acid were formed on the thus vapor deposited magnetic layer in the same manner as in Example 1. The surface pressure was 25 dynes/cm and the water 9 in the bath 3 was water where chlorides of various metals were dissolved. The thus obtained magnetic tapes were checked to measure μ values to a stainless pole and running properties after the repeated run on a β-type VTR in the same manner as in Example 1. The results for four salts of the present invention and two comparative salts are shown in Table 2.

TABLE 2

| Sample No. | Metal salts of palmitic acid | μ value after 100 passes | Number of repeated run |
| --- | --- | --- | --- |
| 7 (invention) | Cd salt | 0.25 | more than 100 passes |
| 8 (invention) | Co salt | 0.26 | more than 100 passes |
| 9 (invention) | Mn salt | 0.27 | more than 100 passes |
| 10 (invention) | Pb salt | 0.27 | more than 100 passes |
| 11 (comparative sample) | K salt | 0.41 | Tape stopped at 32 passes |
| 12 (comparative sample) | Mg salt | 0.38 | Tape stopped at 52 passes |

It is apparent from the above results (Tables 1 and 2) that a thin metal film type magnetic recording medium containing a monomolecular layer of metal salts of stearic acid or palmitic acid using Cd, Co, Mn or Pb as a metal is superior in μ values and running properties after repeated run.

Further, samples prepared by using water 9 in the bath 3 containing at least two kinds of metal ion selected from Cd, Co, Mn and Pb and samples having various kinds of each monomolecular layer (for example, a first monomolecular layer is comprised of Cd salt of stearic acid and the second one is comprised of Co salt of palmitic acid and so on) were also superior in μ values and running properties after repeated run.

These examples (Examples 1 and 2) show that a thin metal film type magnetic recording medium comprising a thin ferromagnetic metal film having provided thereon at least one monomolecular layer comprised of at least one metal salt of saturated fatty acid and the metal which is selected from Cd, Co, Mn and Pb has superior running properties under the condition of a higher temperature as well as a higher humidity than normal ones.

EXAMPLE 3

A polyethylene terephthalate film having a ½ inch width sand a 15 μm thickness in a tape shape was subjected to electroless plating treatment using the same plating solution and plating conditions as in Example 1 to prepare a Co-P (Co content: 98%; P content: 2%) magnetic layer having a 0.25 μm thickness by a continuous plating apparatus.

Further, a Langmuir Blodgett polymerized layer was prepared on a Co-P magnetic layer prepared by the electroless plating method using the apparatus as shown in the FIGURE. The surface pressure was 32 dynes/cm and the water 9 in the bath 3 contained barium chloride. Fatty acids derivatives for preparing a monomolecular layer were vinyl stearate, ω-tricosanoic acid and diacetylene derivative. After three monomolecular layers were formed, γ-ray, electron beams or ultraviolet ray was irradiated thereto respectively. For comparison, a sample containing three monomolecular layers of barium salt of stearic acid was prepared. Still durability on a β-type VTR of the thus obtained samples at a temperature of 40° C. and 30% relative humidity and at a temperature of 40° C. and 80% relative humidity was checked. The results are shown in Table 3.

TABLE 3

| Sample No. | Langmuir Blodgett layer | Still durability (min.) 40° C., 30% RH | 40° C., 80% RH |
| --- | --- | --- | --- |
| 13 (invention) | polymerized layer of vinyl stearate | 30 | 30 |
| 14 (invention) | polymerized layer of ω-tricosanoic acid | 30 | 30 |
| 15 (invention) | polymerized layer of diacetylene derivative | 30 | 30 |
| 16 (comparative sample) | layer of barium stearate | 2 | 5 |

Still durability

Predetermined video signals were recorded on sample tapes using β-type video tape recorder and the time for still image to lose by one third of their clear images was measured at 40° C. and 65% RH (hereinafter, the same).

EXAMPLE 4

A polyethylene terephthalate film having a 12.5 μm thickness was put in a Continuous-Roll Coating System for Vacuum Evaporation. An alloy of Co-Ni (Co content: 75 wt%, Ni content: 25 wt%) was evaporated from an evaporation source by electron beams so that a vapor flow having an angle of incidence of 60° to 90° reached the polyethylene terephthalate film traveling along a cooling can (a cooling roll) to a vapor deposit a magnetic layer having a 0.15 μm thickness. In this instance, oxygen was introduced into the place where the vapor flow had an angle of incident of about 60° C. Varius Langmiur Blodgett polymerized layers were formed on the thus vapor deposited magnetic layer in the same manner as in Example 3. The surface pressure was 28 dynes/cm and five monomolecular layers were formed. For comparison, a sample having five monomolecular layers of only palmitic acid was prepared. Still durability on a VHS type VTR of the thus obtained samples at a temperature of 40° C. and 30% relative humidity and at a temperature of 40° C. and 80% relative humidity was checked. The results are shown in Table 4.

TABLE 4

| Sample No. | Langmuir Blodgett layer | Still durability (min.) 40° C., 30% RH | 40° C., 80% RH |
| --- | --- | --- | --- |
| 17 (invention) | polymerized layer of vinyl stearate | 30 | 30 |
| 18 (invention) | polymerized layer of ω-tricosanoic acid | 30 | 30 |
| 19 (invention) | polymerized layer of diacetylene derivative | 30 | 30 |
| 20 | layer of palmitic acid | 4 | 7 |

TABLE 4-continued

| Sample No. | Langmuir Blodgett layer | Still durability (min.) 40° C., 30% RH | 40° C., 80% RH |
| --- | --- | --- | --- |
| (comparative sample) | | | |

It is apparent from the above results (Tables 3 and 4) that a thin metal film type magnetic recording medium having a Langmuir Blodgett polymerized layer of a polymerized layer of vinyl stearate, a polymerized layer of ω-tricosanoic acid or a polymerized layer of diacetylene derivative is superior in still durability.

Further, samples prepared by using water 9 in the bath 3 containing at least two kinds of metal ion and samples having various kinds of each monomolecular layer (for example, a first monomolecular layer is comprised of a polymerized layer of vinyl stearate and the second monomolecular layer is comprised of a polymerized layer of ω-tricosanoic acid and so on) were also superior in durability.

The thin metal film type magnetic recording medium of the present invention comprising a thin ferromagnetic metal film having provided thereon at least one Langmuir Blodgett polymerized layer is superior in durability at a higher temperature and a higher humidity than a normal temperature and a normal humidity.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon, in sequence, a thin ferromagnetic metal film, and at least one monomolecular layer comprising a saturated fatty acid salt of at least one metal selected from the group consisting of Cd, Co, Mn and Pb, or a polymer of a fatty acid or a derivative thereof, wherein the monomolecular layer comprising a saturated fatty acid salt of the at least one metal is prepared by a Langmuir Blodgett method and wherein the monomolecular layer comprising a polymer of a fatty acid or a derivative thereof is a Langmuir Blodgett polymerized layer.

2. A magnetic recording medium as claimed in claim 1, wherein either monomolecular layer has been subjected to irradiation with electron beams or electromagnetic beams.

3. A magnetic recording medium as claimed in claim 2, wherein the electromagnetic beams are γ-rays or ultraviolet rays.

4. A magnetic recording medium as claimed in claim 1, wherein the at least one monomolecular layer is said polymer of a fatty acid or derivative thereof and wherein said fatty acid or a derivative thereof is selected from the group consisting of a vinyl stearate, ω-triconsanoic acid and a diacetylene derivative.

5. A magnetic recording medium as claimed in claim 4, wherein the diacetylene derivative has the formula $CH_3(CH_2)_{n-1}C_4(CH_2)_8COOH$ wherein n is 8 to 15.

6. A magnetic recording medium as claimed in claim 1, wherein said at least one monomolecular layer comprising said saturated fatty acid salt of said at least one metal is one wherein the saturated fatty acid has 8 to 28 carbon atoms.

7. A magnetic recording medium as claimed in claim 1, wherein the monomolecular layer is a layer wherein monomolecules are regularly and densely arranged on the surface of the thin ferromagnetic metal film, the thickness of the layer being equivalent to the size of one molecule which is in the range of 15 to 50 Å.

8. A magnetic recording medium as claimed in claim 7, wherein the number of monomolecular layers is from 1 to 100.

9. A magnetic recording medium as claimed in claim 8, wherein the total thickness of the monomolecular layer(s) is in the range of 15 Å to 2,000 Å.

10. A magnetic recording medium as claimed in claim 1, wherein the metal is Cd.

11. A magnetic recording medium as claimed in claim 1, wherein the metal is Co.

12. A magnetic recording medium as claimed in claim 1, wherein the metal is Mn.

13. A magnetic recording medium as claimed in claim 1, wherein the metal is Pb.

* * * * *